US005210952A

United States Patent [19]

Hoffman

[11] Patent Number: 5,210,952

[45] Date of Patent: May 18, 1993

[54] METHOD OF AND APPARATUS FOR MANUFACTURING GIFT SET PACKAGING

[75] Inventor: Harry W. Hoffman, Sheboygan Falls, Wis.

[73] Assignee: Bemis Manufacturing Company, Sheboygan Falls, Wis.

[21] Appl. No.: 783,553

[22] Filed: Oct. 25, 1991

[51] Int. Cl.[5] .......... G01B 3/00; B26D 7/01

[52] U.S. Cl. .......... 33/1 G; 33/12; 33/628; 30/315; 83/620

[58] Field of Search .......... 33/1 F, 1 G, 4, 5, 11, 33/12, 633, 653, 628; 30/305, 315, 316; 83/533, 832, 620, 652

[56] References Cited

U.S. PATENT DOCUMENTS

| | | | |
|---|---|---|---|
| 1,406,592 | 2/1922 | Watkins . | |
| 1,963,773 | 6/1934 | Bonanno | 33/12 |
| 1,973,900 | 9/1934 | Hylander | 35/1 G |
| 2,305,567 | 12/1942 | Bole | 33/1 G |
| 2,467,242 | 4/1949 | Swartz | 33/1 G |
| 2,545,409 | 3/1951 | McCall | 33/1 G |
| 2,804,607 | 8/1957 | Nalle, Jr. | 33/1 G |
| 2,883,764 | 4/1959 | Stephens | 33/1 G |
| 2,958,948 | 11/1960 | Dunkelberger | 33/1 G |
| 3,171,204 | 3/1965 | Balducci | 33/1 G |
| 3,242,573 | 3/1966 | Noel . | |
| 3,483,620 | 12/1969 | Miller . | |
| 3,711,951 | 1/1973 | Seiler | 33/12 |
| 3,805,650 | 3/1974 | Pearl | 83/56 |
| 3,895,358 | 7/1975 | Pearl | 340/172 |
| 4,019,264 | 4/1977 | Gall | 33/1 G |
| 4,144,647 | 3/1979 | Mosky et al. | 33/12 |
| 4,178,820 | 12/1979 | Gerber | 83/13 |
| 4,404,750 | 9/1983 | Marx et al. | 33/1 B |
| 4,860,456 | 8/1989 | Arnao | 33/1 B |
| 4,947,322 | 8/1990 | Tenma et al. | 364/401 |

OTHER PUBLICATIONS

Dykstra L. J., "Method of Making Artmasters for Circuit Boards Utilizing Land Areas Having Loading Pins", Western Electric, Technical Digest No. 23, pp. 15-16, Jul. 1971.

*Primary Examiner*—Thomas B. Will
*Attorney, Agent, or Firm*—Michael, Best & Friedrich

[57] ABSTRACT

An apparatus for use in the design of a package including a portion having therein a recessed area adapted to house an article, the apparatus comprising: a model of the package portion, a model of the article, the article model being locatable on the package model, and structure for identifying, in two dimensions, the position and orientation of the article model on the package model when the article model is located on the package model.

16 Claims, 5 Drawing Sheets

METHOD OF AND APPARATUS FOR MANUFACTURING GIFT SET PACKAGING

BACKGROUND OF THE INVENTION

The invention relates to methods of and apparatus for manufacturing gift set packaging.

Known packages, for cutlery for example, include portions having cut-out or recessed areas of the shape of the articles to be packaged (e.g. the shape of cutlery items), which cut-out or recessed areas support the articles in the package against movement relative to the package and provide for viewing of the articles while the articles are supported in the cut-out or recessed areas. This type of package is used with many different types of articles. Another example of this type of package houses chess pieces. Still another example of this type of package houses a pen.

SUMMARY OF THE INVENTION

The invention provides an apparatus for use in the design of a package including a portion having therein a recessed area adapted to house an article, the apparatus comprising: a model of the package portion, a model of the article, the article model being locatable on the package model, and means for identifying, in two dimensions, the position and orientation of the article model on the package model when the article model is located on the package model.

One embodiment of the invention provides a method of designing a package portion which supports, in a recessed area of the package portion, an article, the method comprising the following steps: providing a model of the article, the article model having a plurality of indicia spaced from one another, providing a model of the package portion, placing the article model on the package portion model, identifying the location and orientation, in two dimensions, of the article model on the package portion model, and manufacturing the package portion using the identified location and orientation to create the recessed area for supporting the article.

One embodiment of the invention provides a method of designing a package that supports, in a recessed area therein, an article, the method comprising the following steps: providing a model of the article, the article model having first and second indicia spaced from one another, providing a grid including a plurality of pairs of indicia, one indicium of each pair being capable of being aligned with the first indicium of the model while the other indicium of the pair is aligned with the second indicium of the model, placing the article model on the grid such that the first and second of the indicia on the article model are respectively aligned with first and second of the indicia on the grid, and using the first and second indicia on the grid to identify the location and orientation, in two dimensions, of the article model on the grid.

An advantage of the invention is that it provides for custom designing portions of packages, such as gift packages, that support articles.

Other features and advantages of the invention will become apparent to those of ordinary skill in the art upon review of the following detailed description, claims, and drawings.

Figure 1:
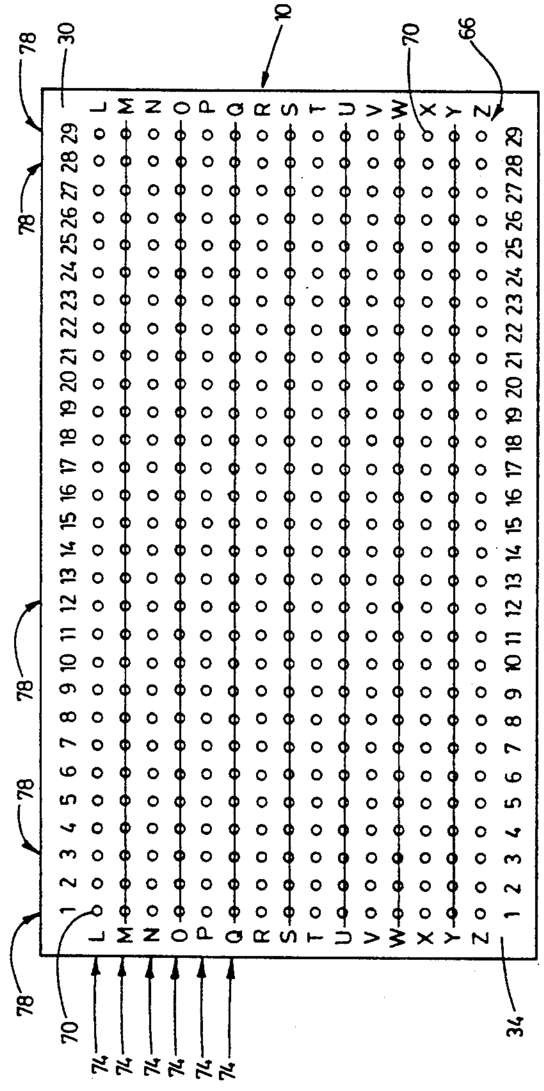
FIG. 1 is a top plan view of a model of a foam piece which forms a portion of a package and which has therein recessed areas adapted to house articles such as cutlery.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

DETAILED DESCRIPTION OF THE PREFERRED EMBODIMENT OF THE INVENTION

Shown in the various figures is an apparatus 10 for use in the design of a package 14 (FIG. 7) including a portion 18 having therein recessed areas 22 adapted to house articles 26 such as cutlery pieces.

The apparatus 10 comprises (see FIG. 1) a model 30 of the package portion 18. The package model 30 is a scale replica, at least in two dimensions and at least in outline, of the package portion 18. In the illustrated embodiment, the package model 30 is a 1:1 scale replica, at least in two dimensions and at least in outline, of the package portion 18. The package model 30 preferably includes a planar surface 34.

The apparatus 10 further comprises models 38 of various articles (cutlery pieces) 26. Each article model 38 is capable of being located on the package model 30. Each article model 38 is a scale replica, at least in two dimensions and at least in outline, of one actual article 26. In the illustrated embodiment, each article model 38 is transparent and is a 1:1 scale replica, at least in two dimensions and at least in outline, of one actual article 26. Each article model 38 includes a bottom planar surface 42, and an upper surface 44. For the sake of clarity, only one article model 38 is described below.

The apparatus 10 further comprises means for identifying, in two dimensions, the position and orientation of the article model 38 on the package model 30 when the planar surface 42 of the article model 38 is located on the planar surface 34 of the package model 30. While various other means could be employed, in the illustrated embodiment, the identifying means comprises, on the article model 38, first, second, third, fourth, and fifth spaced indicia 46, 50, 54, 58, and 62, respectively. The indicia are spaced in a manner described below. In the illustrated embodiment, the indicia 46, 50, 54, 58, and 62 on the article model 38 are respectively defined by first, second, third, fourth, and fifth apertures through the model. Alternatively, the indicia 46, 50, 54, 58, and 62 on the article model 38 could respectively comprise circles (or other shapes) printed or defined on the article model 38. The indicia 46, 50, 54, 58, and 62 on the article model 38 are preferably linearly aligned, and are lettered or numbered. In the illustrated embodiment, the indicia 46, 50, 54, 58, and 62 are identified by reference letters A, B, C, D and E, respectively, on the top surface 44 of article model 38.

The identifying means further comprises, on the package model 30, a grid 66 including a plurality of pairs of indicia 70, one indicium 70 of each pair being capable of being aligned with the first indicium 46 of the article model 38 while the other indicium of the pair is aligned with one of the other indicia 50, 54, 58 and 62 of the article model 38. The grid 66 on the package model 30 is defined by a plurality of rows 74 and columns 78 of indicia 70. In each row 74 all distances between adjacent indicia 70 in the row 74 are equal, and in each column 78 all distances between adjacent indicia 70 in the column 78 are equal. The distance between adjacent indicia 70 in each row 74 is equal to the distance between adjacent indicia 70 in each column 78. The rows 74 are lettered consecutively and the columns 78 are numbered consecutively. For clarity in FIG. 3, the apertures 46, 50, 54, 58, and 62 are illustrated with dark circles so as to distinguish the apertures 46, 50, 54, 58, and 62 from the indicia 70.

The distance between the first and second indicia 46 and 50 on the article model 38 is equal to the distance between adjacent indicia 70 in each row 74 or column 78 of the grid 66. The distance between the other indicia 50, 54, 58 and 62 on the article model 38 is not equal to the distance between the first and second indicia 46 and 50 on the article model 38. More particularly, the indicia 46, 50, 54, 58, and 62 are spaced on the article model 38 such that the indicium 46 on the article model is aligned with one indicium 70 on the grid and one of the indicia 50, 54, 58, and 62 on the article model is aligned with another indicium 70 on the grid when the article model 38 is in one of several angular orientations on the grid 66. When the indicium 46 on the article model is aligned with one indicium 70 on the grid, the angular orientation of the article model is defined by which of the indicia 50, 54, 58, and 62 is aligned with another indicium 70.

Figure 3:
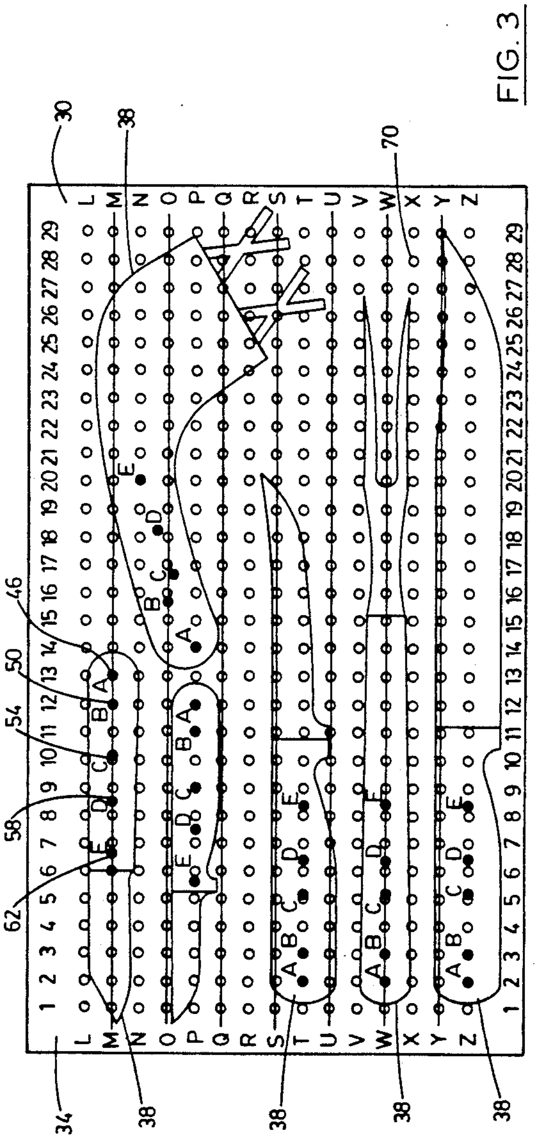
FIG. 3 is a top plan view showing the article models of FIG. 2 located on the package portion model of FIG. 1.
Figure 2:
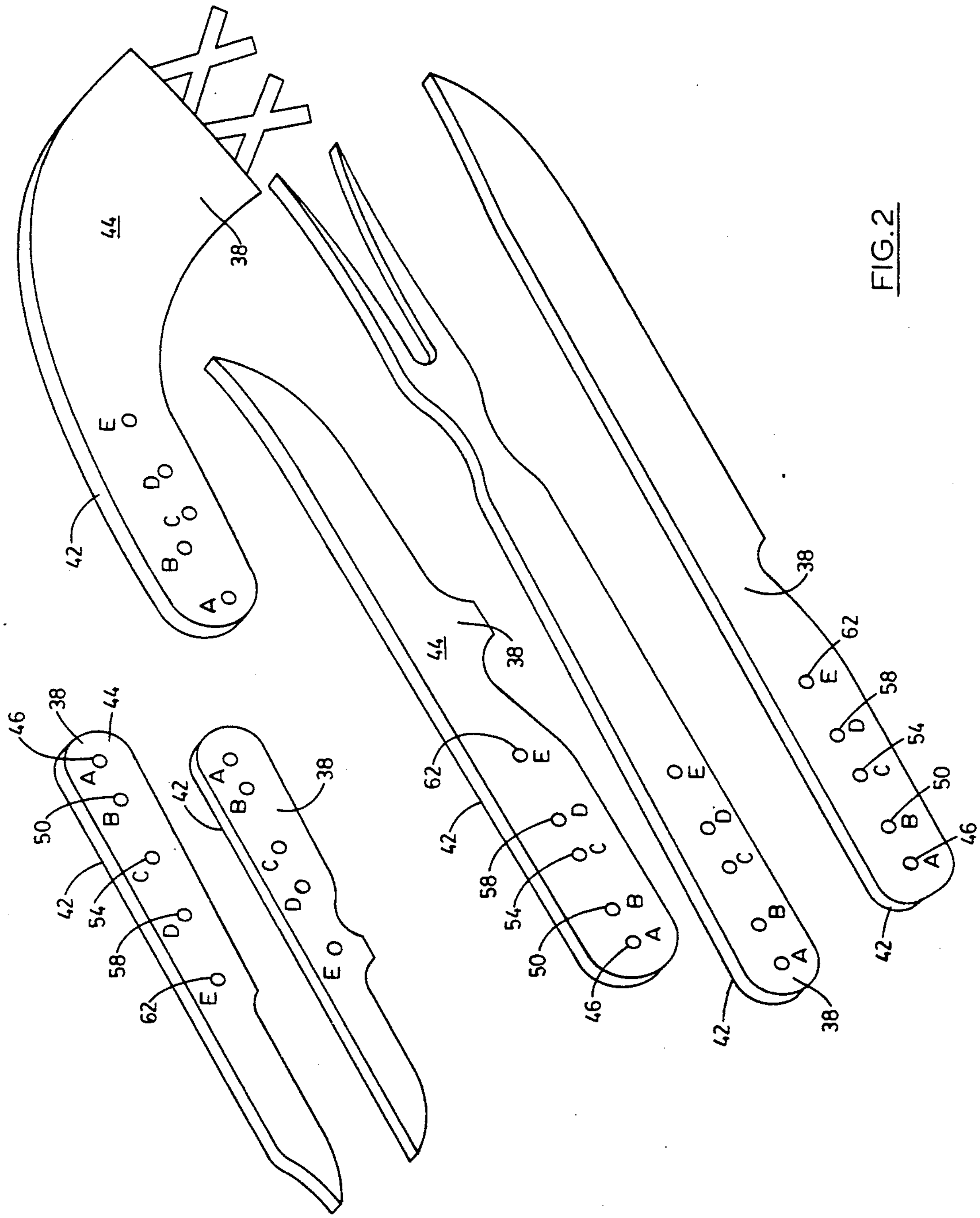
FIG. 2 is a perspective view of article models which are used in accordance with the invention with the model, shown in FIG. 1, of the foam piece.

For example, consider the upper left most article model 38 on the grid 66 in FIG. 3. While the indicium 46 (lettered "A") on the article model 38 is aligned with the indicium 70 located at row M, column 13, the other indicia can be located as follows: the indicium 50 ("B") on the article model is capable of being aligned with the indicium 70 located at row M, column 12 on the grid 66, with the article model 38 oriented horizontally (this is the positioning of the article model 38 shown in FIG. 3); the indicium 50 ("B") is capable of being aligned with the indicium 70 located at row M, column 14 on the grid 66, with the article model 38 oriented horizontally; the indicium 50 ("B") is capable of being aligned with the indicium 70 located at row N, column 13 on the grid 66, with the article model 38 oriented vertically; the indicium 54 ("C") is capable of being aligned with the indicium 70 located at row O, column 11 on the grid 66, with the article model 38 oriented at 45° from horizontal; the indicium 54 ("C") is capable of being aligned with the indicium 70 located at row O, column 15 on the grid 66, with the article model 38 oriented at 45° from horizontal; the indicium 58 ("D") is capable of being aligned with the indicium 70 located at row O, column 9 on the grid 66, with the article model 38 oriented at 26.6° ($\tan^{-1}(2/4)$) from horizontal; the indicium 58 ("D") is capable of being aligned with the indicium 70 located at row O, column 17 on the grid 66, with the article model 38 oriented at 26.6° ($\tan^{-1}(2/4)$) from horizontal; the indicium 62 ("E") is capable of being aligned with the indicium 70 located at row O, column 7 on the grid 66, with the article model 38 oriented at 18.4° ($\tan^{-1}(2/6)$) from horizontal; and the indicium 62 ("E") is capable of being aligned with the indicium 70 located at row O, column 19 on the grid 66, with the article model 38 oriented at orientations and positions is identified by identifying the indicium 70 with which indicium A is aligned (the indicium 70 at row M, and column 13 in each of the above cases) and by identifying the indicium 70 with which only one of the other indicia B, C, D and E is aligned. More orientations would be possible, of course, if the article model 38 were shorter and the indicium 46 thereon were aligned with an indicium 70 located closer to the center of the grid 66.

Figure 4:
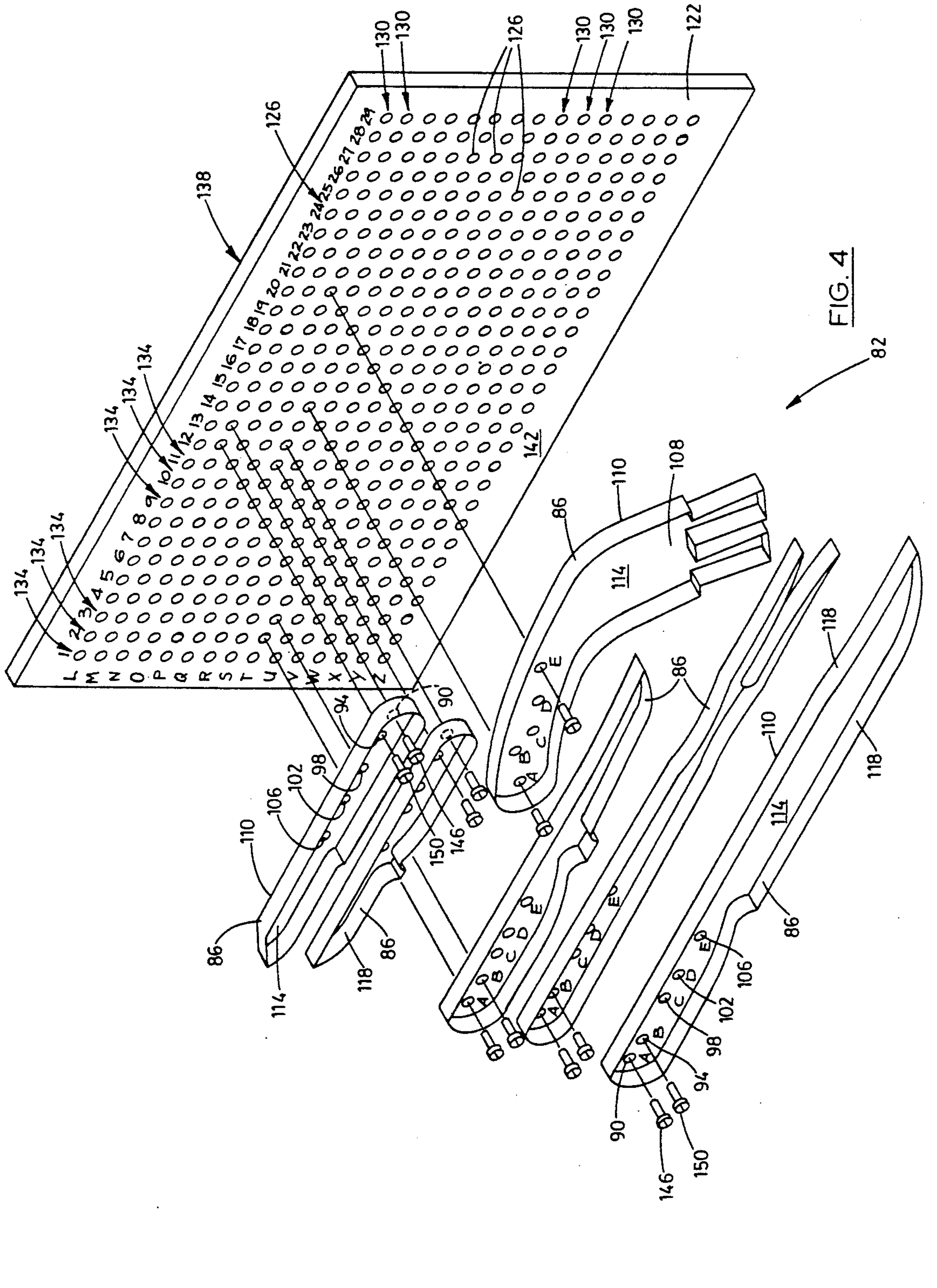
FIG. 4 is an exploded view of a cutter assembly in accordance with the invention.
Figure 5:
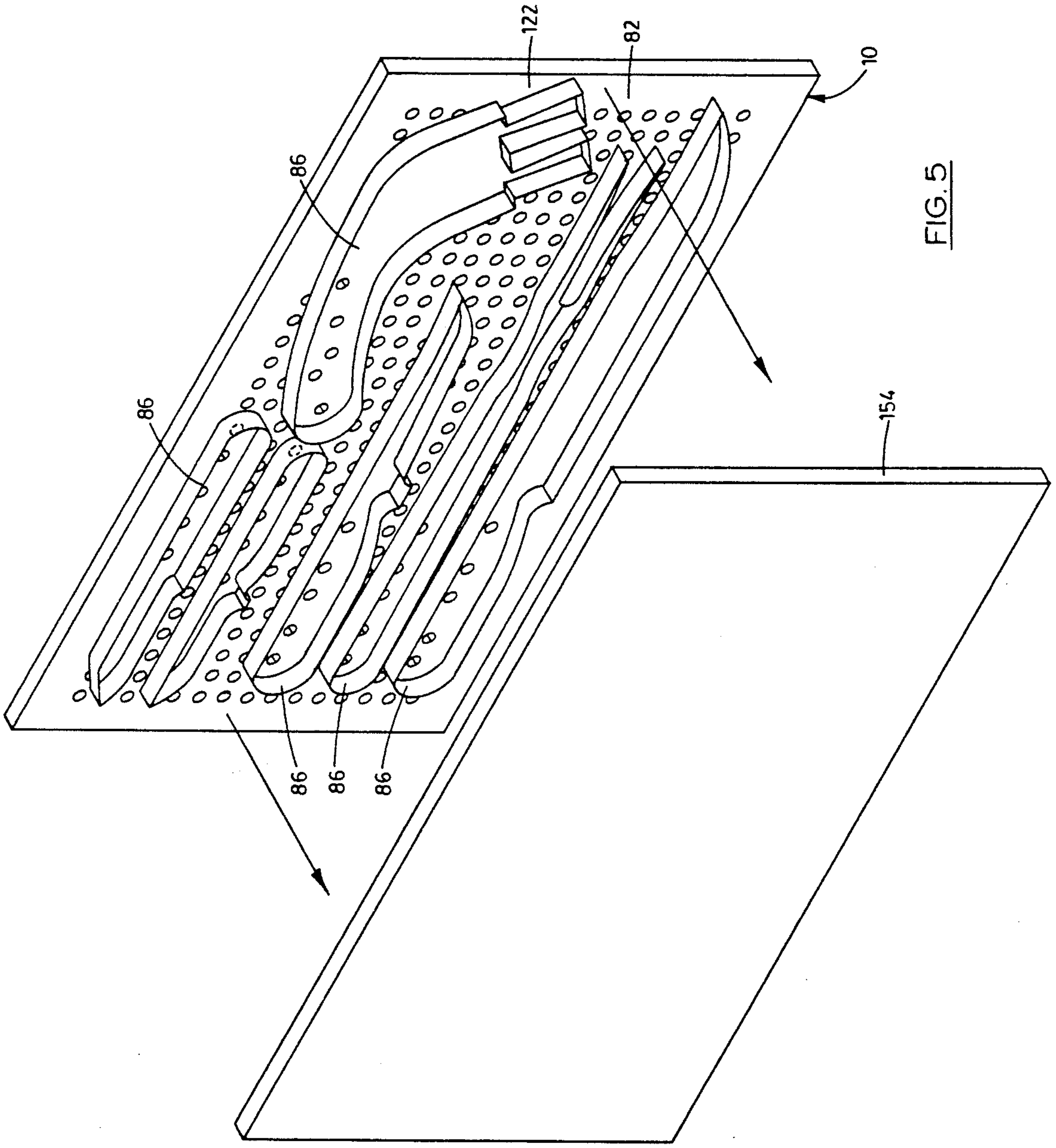
FIG. 5 is a perspective view showing the cutter assembly of FIG. 4 in assembled form and about to cut a foam piece.

The apparatus 10 further comprises (see FIGS. 4 and 5) a cutter assembly 82 including cutters 86. Each cutter 86 is a 1:1 scale replica, at least in two dimensions and at least in outline, of one of the article models 38. Each cutter 86 has thereon (see FIG. 4) first, second, third, fourth, and fifth indicia 90, 94, 98, 102, and 106, respectively, that are respectively aligned with the first, second, third, fourth, and fifth indicia 46, 50, 54, 58, and 62 on the associated article model 38 if the article model 38 is aligned with the cutter 86. The cutter 86 has a main portion 108 having an inner surface 110, and an outer surface 114, and, in the illustrated embodiment, the first, second, third, fourth and fifth indicia 90, 94, 98, 102, and 106 on the cutter 86 comprise respective apertures through the main portion 108 of the cutter 86. The apertures 90, 94, 98, 102, and 106 through the cutter 86 are lettered or numbered in the same way as are the apertures 46, 50, 54, 58, and 62 on the article model 38 if the inner surface 110 of the cutter 86 is lettered or numbered. If the outer surface 114 of the cutter 86 is lettered or numbered in addition to or instead of the inner surface of the cutter 86, the apertures 90, 94, 98, 102, and 106 are lettered or numbered on the outer surface in mirror image correspondence to the lettering or numbering of the indicia 46, 50, 54, 58, and 62 on the article model 38. The cutter 86 further includes a blade portion 118 depending from the main portion 108 in a cookie cutter-like fashion.

The cutter assembly 82 further comprises a stamping plate 122 that is a 1:1 scale replica, at least in two dimensions and at least in outline, of the package model 30. The stamping plate 122 has thereon a plurality of indicia 126. At least some of the indicia 126 on the stamping plate 122 are respectively aligned with indicia 70 on the grid 66 if the package model 30 is aligned with the stamping plate 122. In the illustrated embodiment, the stamping plate 122 has rows 130 and columns 134 of indicia 126. More particularly, in the illustrated embodiment, each of the indicia 126 on the stamping plate 122 comprises an aperture through the stamping plate 122.

The number of apertures 126 through the stamping plate 122 equals the number of indicia 70 on the grid 66, and each aperture 126 through the stamping plate 122 is aligned with one of the indicia 70 on the grid 66 if the package model 30 is aligned with the stamping plate 122. The stamping plate 122 has a rear surface 138 and a front surface 142. The rows 130 and the columns 134 of apertures 126 through the stamping plate 122 are lettered or numbered in the same way as are the rows 74 and columns 78 of the indicia 70 on the grid 66 if the front surface 142 of the stamping plate 122 is lettered or numbered. If the rear surface 138 of the stamping plate 122 is lettered or numbered in addition to or instead of the front surface 142 of the stamping plate 122, the rows 130 and columns 134 of apertures are lettered or numbered on the rear surface 138 of the stamping plate 122 in mirror image correspondence to the lettering or numbering of the rows 74 and columns 78 of the indicia 70 on the grid 66. In the illustrated embodiment, the thickness of the stamping plate 122 (the perpendicular distance between the surfaces 138 and 142) is one half inch.

Each cutter 86 is securable to the stamping plate 122 with two of the apertures 90, 94, 98, 102, 106 through the cutter 86 being in respective alignment with two of the apertures 126 through the stamping plate 122. More particularly, the apparatus 10 further includes a first screw 146 passing through one of the apertures 90, 94, 98, 102, and 106 in the cutter 86 and through one of the apertures 126 in the stamping plate 122 and securing the cutter 86 to the stamping plate 122. The apparatus 10 further includes a second screw 150 passing through another one of the apertures 90, 94, 98, 102, and 106 in the cutter 86 and through another one of the apertures 126 in the stamping plate 122 and securing the cutter 86 to the stamping plate 122.

In use, a sales representative first provides various models 38 of articles 26 to a customer. Some of the article models 38 may have different configurations than other of the article models 38. For example, in the illustrated embodiment, the article models 38 include models of paring knives, knife sharpeners, forks, boners, and slicers. The customer selects how many of each of the articles 26 he or she desires to have in the package 14, and selects corresponding article models 38. The customer then places the article models 38 on the grid 66 such that for each article model 38, two of the indicia 46, 50, 54, 58, 62 on the article model 38 are respectively aligned with two of the indicia 70 on the grid 66, and such that no portion of any of the article models 38 on the grid 66 overlaps a portion of another of the article models 38 on the grid 66 or lies outside of the grid 66.

Next, the customer or sales representative uses the indicia on the models 38 and on the grid 66 to identify the location and orientation, in two dimensions, of each article model 38 on the grid 66. More particularly, the customer or sales representative identifies, using the numbering or lettering on the grid 66 and on the article model 38, which of the indicia 46, 50, 54, 58, and 62 on each article model 38 are aligned with which of the indicia 70 on the grid 66. For example, the article model 38 of a slicer knife in the lower left corner of the grid 66 in FIG. 3 is located with indicia A aligned with the indicia 70 at row Z, column 2, and with the indicia B aligned with the indicia 70 at row Z, column 3. This information is conveyed to a factory where the cutters 86 corresponding in configuration to the article models 38 chosen by the customer are secured to the stamping plate 122, with each cutter 86 secured by the screws 146 and 150. The first screw 146 passes through one of the identified apertures 90, 94, 98, 102, and 106 in the cutter 86 and through the corresponding identified aperture 126 in the stamping plate 122. The second screw 150 passes through the other of the identified apertures 90, 94, 98, 102, and 106 in the cutter 86 and through the identified aperture 126 through the stamping plate 122. For example, if the sales representative informs the factory that the customer placed an article model 38 representing a slicer knife on the grid 66 with the indicia 46 ("A") and 50 ("B") on the article model 38 respectively aligned with indicia 70 located at row Z, column 2, and at row Z, column 3, then, at the factory, a cutter 86 representing a slicer knife is attached to the stamping plate 122 with the first screw 146 passing through the aperture 90 in the cutter 86 and the aperture located at row Z, column 2 on the stamping plate 122, and with the second screw 150 passing through the aperture 94 in the cutter 86 and through the aperture located at row Z, column 3 on the stamping plate 122. Other means or additional screws (not shown) may optionally be used to secure the cutters 86 to the stamping plate 122.

Figure 6:
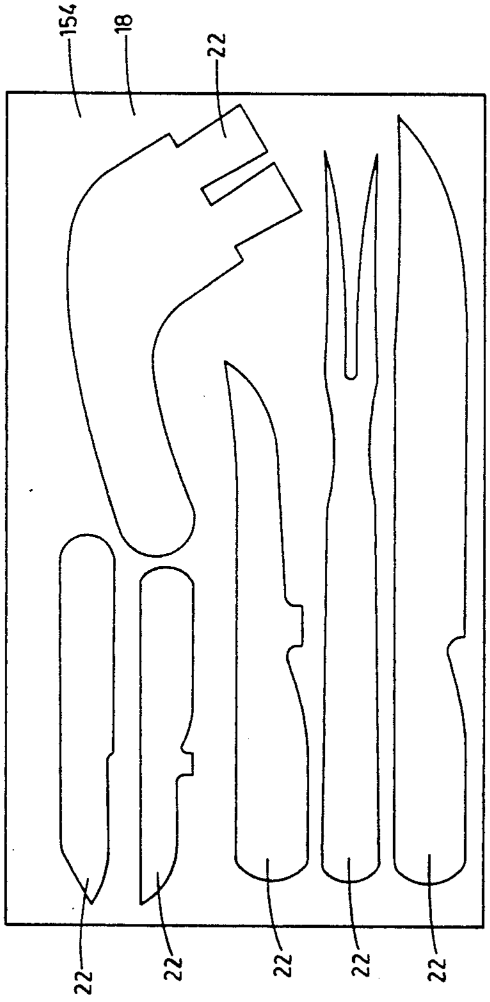
FIG. 6 is plan view showing the foam piece of FIG. 5 after having been cut by the cutter assembly to form recesses for housing articles.
Figure 7:
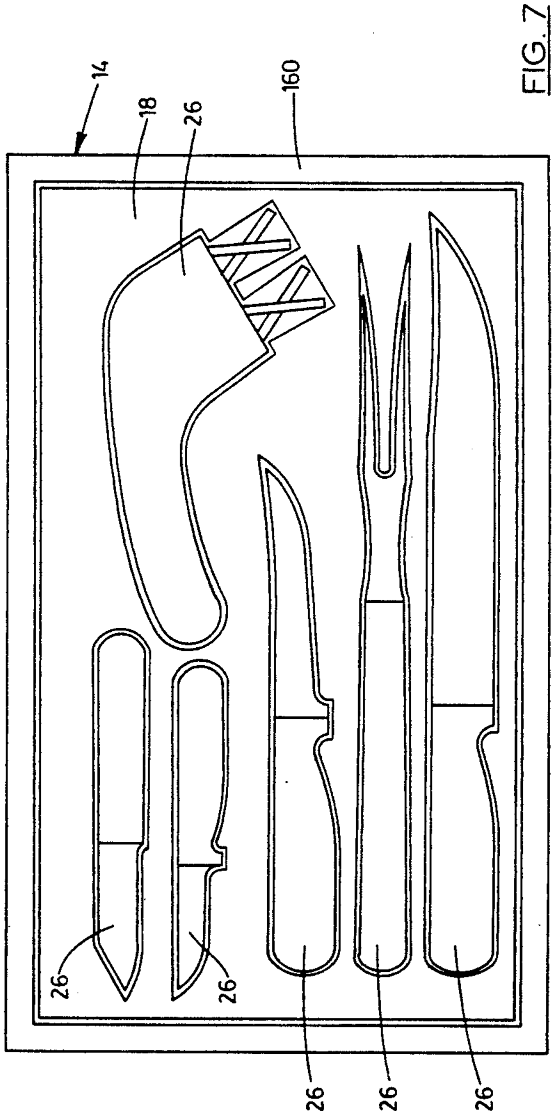
FIG. 7 is a plan view of a package including a portion which has therein recessed areas housing articles, which package portion was defined by the cut foam piece of FIG. 6.

Next (see FIGS. 5 and 6), a foam piece 154 is cut, using the stamping plate 122 and the cutters 86 secured to the stamping plate 122, so that portions are removed from the foam piece 154, thereby defining the package portion 18 with recesses 22 corresponding to articles 26 that are to be housed. In the illustrated embodiment of the invention, the foam piece 154 is a 20 pound density foam such as that manufactured by American Excelsior Company. Optionally, the package portion 18 is defined by a material other than foam. The package portion 18 is then inserted into a casing or box 160, as shown in FIG. 7, to define the package 14. The cutter assembly 82 can be saved and reused with the stamping plate 122 and the cutters 86 either assembled or disassembled. If cutter assemblies 82 are saved in assembled form, an inventory can be kept of saved cutter assemblies 82, and if a customer identifies locations and orientations of article models 38 on the grid 66 that corresponds to previously identified locations and orientations of the same types of article models, an appropriate saved cutter assembly 82 can be reused.

The recesses 22 are arranged in a manner corresponding to the manner in which the customer arranged the article models 38 on the grid 66. Thus, the invention provides a method and apparatus 10 for custom designing portions of packages, such as gift packages, that support articles.

Various of the features of the invention are set forth in the following claims.

I claim:

1. An apparatus for use in the design and manufacturing of a package including a portion having therein a recessed area adapted to house an article, said apparatus comprising:

a model of the package portion, said package model having thereon a grid including a plurality of pairs of indicia, said package model having thereon symbols defining means for describing the location of each indicium on said model, and for providing a unique location description for each indicium; and a model of the article, said article model being locatable on said package model, said article model having thereon a first indicium and a second indicium spaced from the first indicium, one indicium of each pair of said package model being capable of being aligned with said first indicium of said article model while the other indicium of said pair of aligned with said second indicium of said article model, said article model further having thereon symbols defining means for identifying each of said indicia on said article model;

such that said indicia on said package model and said indicia on said article model can be used for identifying, in two dimensions, the position and orientation of said article model on said package model by identifying which of said grid indicia are aligned with each of said article model indicia when said article model is located on said package model; and said apparatus further comprising a cutter assembly including a cutter that is a scale replica, at least in two dimensions and at least in outline, of said article model, and that has thereon first and second indicia that are respectively aligned with said first and second indicia on said article model if said article model is aligned with said cutter, and said cutter assembly further including means for supporting said cutter, said supporting means including a stamping plate having thereon a plurality of indicia, at least some of said indicia on said stamping plate being respectively aligned with indicia on said grid if said package model is aligned with said stamping plates.

2. An apparatus in accordance with claim 1 wherein said model of the article is transparent.

3. An apparatus in accordance with claim 1 wherein said grid on said package model is defined by a plurality of rows and columns of indicia, wherein in each row all distances between adjacent indicia in the row are equal, and wherein in each column all distances between adjacent indicia in the column are equal.

4. An apparatus in accordance with claim 3 wherein the distance between adjacent indicia in each row is equal to the distance between adjacent indicia in each column, and wherein said symbols on said package model comprise sequential numbering or lettering of said rows, and sequential lettering or numbering of said columns.

5. An apparatus in accordance with claim 4 wherein said article model further has thereon a third indicium, wherein said first indicium on said article model is adjacent said second indicium on said article model, wherein the distance between said first and second indicia on said article model is equal to the distance between adjacent indicia in each column of said grid, and wherein one indicium of each pair of indicia on said grid is capable of being aligned with said first indicium of said article model while the other indicium of each pair is aligned with said second or third indicium of said article model.

6. An apparatus in accordance with claim 1 wherein said article model is a replica, at least in two dimensions and at least in outline, of a cutlery piece, and wherein said package model is a replica, at least in two dimensions and at least in outline, of the package portion.

7. An apparatus in accordance with claim 1 wherein said package model is a 1:1 scale replica, at least in two dimensions and at least in outline, of the package portion, and wherein said article model is a 1:1 scale replica, at least in two dimensions and at least in outline, of the article.

8. An apparatus in accordance with claim 1 wherein said first and second indicia on said article model comprise respective apertures in said article model, and wherein said first and second indicia on said cutter respectively comprise first and second apertures through said cutter.

9. An apparatus in accordance with claim 1 wherein said stamping plate is a scale replica, at least in two dimensions and at least in outline, of said package model, and wherein said cutter is securable to said stamping plate with said first and second indicia on said cutter in respective alignment with first and second of said indicia on said stamping plate.

10. An apparatus in accordance with claim 9 wherein said stamping plate is a 1:1 scale replica, at least in two dimensions and at least in outline, of said package model, and wherein said cutter is a 1:1 scale replica, at least in two dimensions and at least in outline, of said article model.

11. An apparatus in accordance with claim 10 wherein each of said indicia on said stamping plate comprises an aperture through said stamping plate, wherein the number of apertures through said stamping plate equals the number of indicia on said grid, wherein said first and second indicia on said cutter respectively comprise first and second apertures through said cutter, wherein each aperture through said stamping plate is aligned with one of said indicia on said grid if said package model is aligned with said stamping plate, and wherein said cutter is securable to said stamping plate with said first and second apertures through said cutter being in respective alignment with a first and a second of said apertures through said stamping plate.

12. An apparatus for use in the design of a package including a portion having therein a recessed area adapted to house an article, said apparatus comprising:

a model of the package portion, a model of the article, said article model being locatable on said package model, and means for identifying, in two dimensions, the position and orientation of said article model on said package model when said article model is located on said package model, said identifying means including, on said article model, a first indicium and a second indicium spaced from the first indicium, and, on said package mode, a grid including a plurality of pairs of indicia, one indicium of each pair being capable of being aligned with said first indicium of said article model while the other indicium of said pair is aligned with said second indicium of said article model, said first and second indicia on said model of the article being respectively defined by first and second apertures through said model.

13. An apparatus for use in the design of a package including a portion having therein a recessed area adapted to house an article, said apparatus comprising:

a model of the package portion, a model of the article, said article model being locatable on said package model, and means for identifying, in two dimensions, the position and orientation of said article model on said package model when said article model is located on said package model, said identifying means including, on said article model, a first indicium, a second indicium adjacent to, spaced apart from, and linearly aligned with said first indicium, and a third indicium linearly aligned with said first and second indicia, the distance between said second and third indicia on said article model not being equal to the distance between said first and second indicia on said article model, and said identifying means further including, on said package model, a grid including a plurality of pairs of indicia, one indicium of each pair being capable of being aligned with said first indicium of said article model while the other indicium of said pair is aligned with said second or third indicium of said article model, said grip on said package model being defined by a plurality of rows and columns and indicia, wherein in each row all distances between adjacent indicia in the row are equal, and wherein in each column all distances between adjacent indicia in the column are equal, said rows being lettered and numbered and said columns being lettered and numbered, the distance between said first and second indicia on said article model being equal to the distance between adjacent indicia in each column of said grid.

14. A method of designing and manufacturing a package portion which supports, in a recessed area of the package portion, an article of cutlery, said method comprising the following steps:

providing a model of the article of cutlery, the article model having a plurality of indicia spaced from one another, providing a model of the package portion, and providing a cutter assembly including a cutter that is a scale replica, in at least two dimensions and at least in outline, of the article model, and that has thereon first and second indicia that are respectively aligned with indicia on the article model if the article model is aligned with the cutter, and the cutter assembly further including means for supporting the cutter, the supporting means including a stamping plate, placing said article model on the package portion model.

identifying the location and orientation, in two dimensions, of the article model on the package portion model, and manufacturing the package portion using the cutter and the stamping plate to create the recessed area for supporting the article by using the identified location and orientation to locate the cutter on the stamping plate.

15. A method of designing and manufacturing a package that supports, in a recessed area therein, an article, said method comprising the following steps:

providing a model of the article, the article model having first and second indicia spaced from one another;

providing a grid including a plurality of pairs of indicia, one indicium of each pair being capable of being aligned with the first indicium of the model while the other indicium of the pair is aligned with the second indicium of the model, placing the article model on the grid such that the first and second of the indicia on the article model are respectively aligned with first and second of the indicia on the grid, using the first and second indicia on the grid to identify the location and orientation, in two dimensions, of the article model on the grid, providing a cutter that is a 1:1 scale replica, at least in two dimensions and at least in outline, of the article model, and that has thereon first and second indicia that are respectively aligned with the first and second indicia on the model if the model is aligned with the cutter;

providing a stamping plate that is a 1:1 scale replica, at least in two dimensions and at least in outline, of the grid, the stamping plate having thereon a plurality of indicia, at least some of the indicia on the stamping plate being respectively aligned with the indicia on the grid if the stamping plate is aligned with the grid, and securing the cutter to the stamping plate at a location and orientation corresponding to the plotted location and orientation of the article model on the grid.

16. A method in accordance with claim 15 and further comprising the steps of providing a foam piece that is adapted to define a portion of the packaging, and cutting the foam using the stamping plate and cutter at a location and orientation corresponding to the plotted location and orientation of the article model on the grid, thereby defining a material removed portion in the foam so as to define, in the packaging portion, the recessed area.

* * * * *

UNITED STATES PATENT AND TRADEMARK OFFICE

CERTIFICATE OF CORRECTION

PATENT NO. : 5,210,952

DATED : May 18, 1993

INVENTOR(S) : HARRY W. HOFFMAN

It is certified that error appears in the above-identified patent and that said Letters Patent is hereby corrected as shown below:

In Column 4, line 19, after "oriented at", insert --18.4° ($tan^{-1}$ (2/6)) from horizontal. Each of the above-mentioned--.

In Column 7, line 1, delete "of" (second occurrence) and insert --is--.

In Column 7, line 51, delete "each" and insert --said--.

In Column 9, line 11, delete "and" and insert --or--.

In Column 9, line 12, delete "and" (second occurrence) and insert --or--.

In Column 9, line 25, delete "in at least" and insert --at least in--.

Signed and Sealed this

Seventeenth Day of May, 1994

Attest:

BRUCE LEHMAN

*Attesting Officer* — *Commissioner of Patents and Trademarks*